United States Patent
Yoo et al.

(10) Patent No.: US 7,638,730 B2
(45) Date of Patent: Dec. 29, 2009

(54) APPARATUS FOR CUTTING GLASS PLATE

(75) Inventors: Ki-Ryong Yoo, Suwon-shi (KR);
Choon-Taek Kim, Suwon-shi (KR);
Min-Young An, Jeonju-shi (KR);
Mi-Jee Kim, Yongin-shi (KR)

(73) Assignee: Rorze Systems Corporation, Yongin-shi, Kyunggi-do (KR)

( * ) Notice: Subject to any disclaimer, the term of this patent is extended or adjusted under 35 U.S.C. 154(b) by 432 days.

(21) Appl. No.: 10/549,928

(22) PCT Filed: Mar. 18, 2004

(86) PCT No.: PCT/KR2004/000592

§ 371 (c)(1),
(2), (4) Date: Jul. 28, 2006

(87) PCT Pub. No.: WO2004/083133

PCT Pub. Date: Sep. 30, 2004

(65) Prior Publication Data

US 2007/0170161 A1 Jul. 26, 2007

(30) Foreign Application Priority Data

Mar. 21, 2003 (KR) .................. 10-2003-0017901
Mar. 21, 2003 (KR) .................. 10-2003-0017902
Nov. 7, 2003 (KR) .................. 10-2003-0078797

(51) Int. Cl.
*B23K 26/06* (2006.01)
*B23K 26/067* (2006.01)

(52) U.S. Cl. .................. 219/121.68; 219/121.73; 219/121.76; 219/121.77; 225/2

(58) Field of Classification Search ..................
219/121.67–121.69, 121.72, 121.76, 121.77,
219/121.78, 121.73; 225/2, 96.5; 65/102,
65/105, 112, 174
See application file for complete search history.

(56) References Cited

U.S. PATENT DOCUMENTS 3,777,280 A 12/1973 Pohl .......................... 331/94.5

(Continued)

FOREIGN PATENT DOCUMENTS

EP 0062484 10/1982

(Continued)

*Primary Examiner*—Samuel M Heinrich
(74) *Attorney, Agent, or Firm*—Baker & Hostetler LLP

(57) ABSTRACT

Disclosed herein is an apparatus for cutting a glass plate. The apparatus comprises a cracking means for forming a minute crack at a point on the glass plate where the cutting is started, at least one scribing means using a laser beam absorbed by the glass plate, at least one quenching means using a quenching fluid after irradiation of the laser beam, a breaking means using the laser beam. The breaking means comprises a laser oscillator, a reflection mirror and a focusing lens. The focusing lens has at least two or more focal lengths. The apparatus may further apparatus further comprise a photo mask formed with light transmission openings for transmitting a part of the laser beam to be irradiated on the glass plate instead of the focusing lens. With the apparatus of the present invention, the problems caused by the conventional lens, such as a reduced straightness of a cutting line or a rough cutting plane, can be prevented, thereby providing a clean cutting plane.

2 Claims, 3 Drawing Sheets

U.S. PATENT DOCUMENTS

| | | | | |
|---|---|---|---|---|
| 4,714,628 A | * | 12/1987 | Eloy | 427/523 |
| 4,842,782 A | * | 6/1989 | Portney et al. | 264/1.37 |
| 5,061,840 A | * | 10/1991 | Portney et al. | 219/121.68 |
| 5,180,921 A | * | 1/1993 | Moreau et al. | 250/554 |
| 5,389,954 A | * | 2/1995 | Inaba et al. | 347/258 |
| 5,609,284 A | * | 3/1997 | Kondratenko | 225/1 |
| 5,651,904 A | * | 7/1997 | Franke et al. | 219/121.72 |
| 5,984,159 A | * | 11/1999 | Ostendarp et al. | 225/93.5 |
| 6,067,105 A | * | 5/2000 | Kim | 347/256 |
| 6,087,619 A | * | 7/2000 | Berkmanns et al. | 219/121.63 |
| 6,114,654 A | * | 9/2000 | Nishiwaki | 219/121.77 |
| 6,160,835 A | * | 12/2000 | Kwon | 372/108 |
| 6,501,047 B1 | * | 12/2002 | Xuan et al. | 219/121.69 |
| 6,541,730 B2 | * | 4/2003 | Nam et al. | 219/121.67 |
| 6,812,430 B2 | * | 11/2004 | Kang et al. | 219/121.72 |
| 7,002,101 B2 | * | 2/2006 | Cuvelier | 219/121.72 |
| 7,098,155 B2 | * | 8/2006 | Talwar et al. | 438/795 |

FOREIGN PATENT DOCUMENTS

| | | | | |
|---|---|---|---|---|
| JP | 356122690 A | * | 9/1981 | |
| JP | 63016893 | | 1/1988 | |
| JP | 411005184 A | * | 1/1999 | |
| JP | 02000005892 A | * | 1/2000 | |
| JP | 02000210785 A | * | 8/2000 | |
| JP | 02001232488 A | * | 8/2001 | |
| JP | 02002137078 A | * | 5/2002 | |
| JP | 2002-178179 | | 6/2002 | |
| KR | 10-2000-0042313 | | 7/2000 | |
| KR | 20-0295280 | | 11/2002 | |
| KR | 10-2003-0000645 | | 1/2003 | |

* cited by examiner

[Fig. 1]
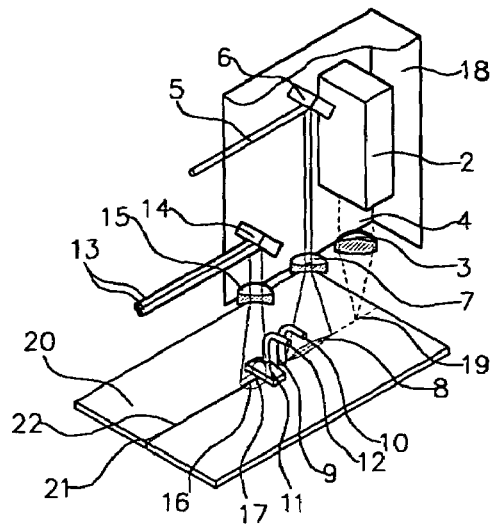
[Fig. 2]
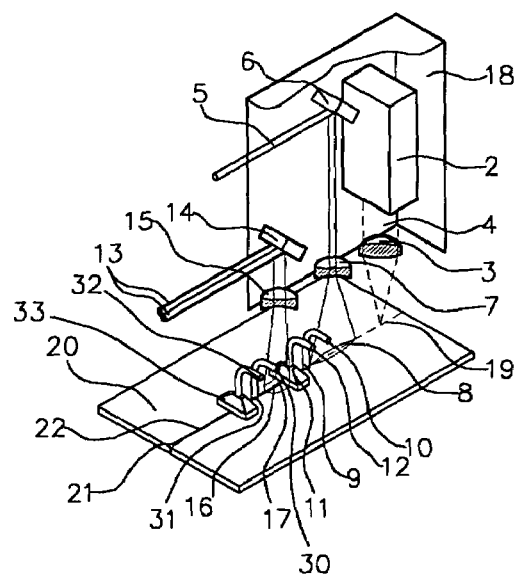
[Fig. 3]
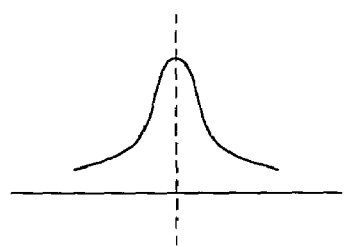

[Fig. 4]
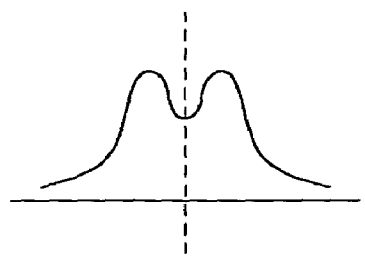
[Fig. 5]
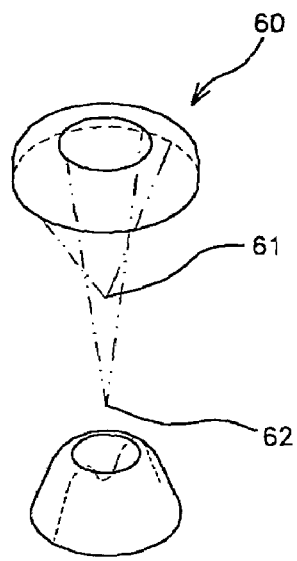
[Fig. 6]
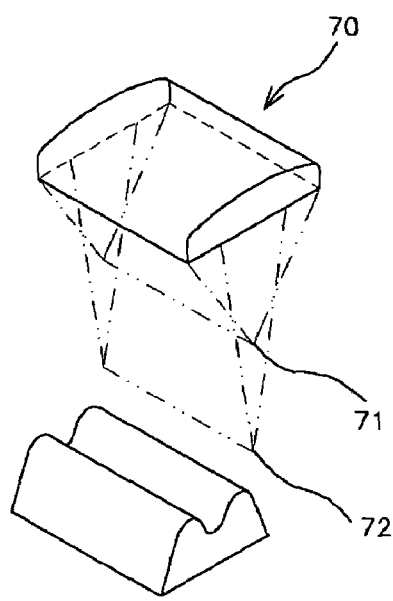

[Fig. 7]
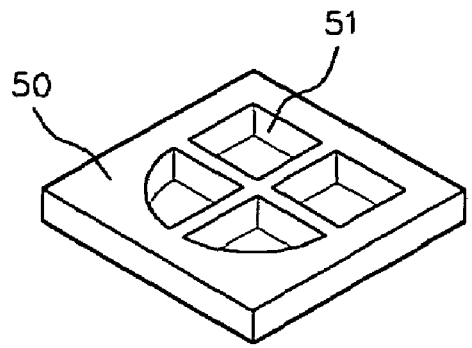
[Fig. 8]
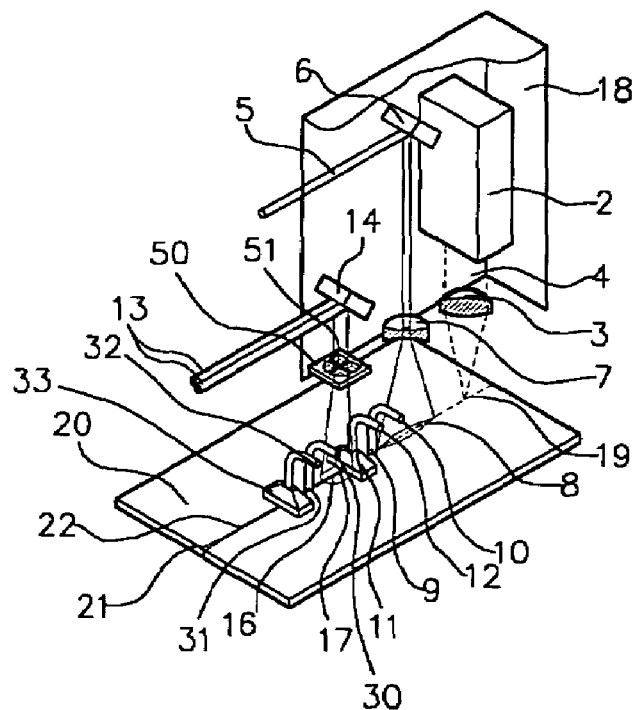
[Fig. 9]
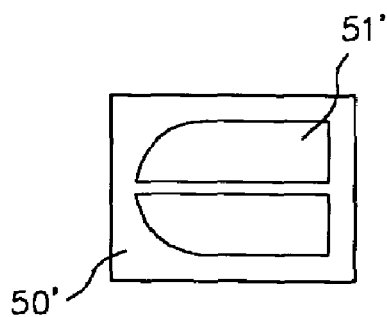

APPARATUS FOR CUTTING GLASS PLATE

CROSS REFERENCE TO RELATED APPLICATIONS

This application claims priority to Patent Cooperation Treaty (PCT) Application No. PCT/KR2004/000592 filed on Mar. 18, 2004 entitled, APPARATUS FOR CUTTING GLASS PLATE, which claims priority to Korean Patent Application No. 2003-0017901 filed Mar. 21, 2003; and Korean Patent Application No. 2003-0017902 filed Mar. 21, 2003; and Korean Patent Application No. 2003-0078797 filed Nov. 7, 2003; all of the above disclosures are herein incorporated by reference in their entirety.

TECHNICAL FIELD

The present invention relates to an apparatus for cutting a glass plate with a laser beam, and more particularly to an apparatus for cutting a glass plate with a laser beam, which comprises a means for lowering an energy level of the laser beam passing through a lens for a braking process in order to prevent a cutting plane from being deteriorated due to an energy distribution of the laser beam showing a maximum energy level on a scribe line during the braking process and a scribing process for cutting the glass plate with the laser beam.

BACKGROUND ART

As a conventional method for cutting a glass plate, there are a method for cutting the glass plate with the application of a mechanical stress after forming a scribe line using an ultra hard material, such as diamond, and a method for forming the scribe line using a laser beam instead of the ultra hard material before applying the stress, as developed as an alternative to the above method.

DISCLOSURE OF INVENTION

Technical Problem

Among the above conventional methods, as the former produces a sharp and irregular cutting plane, it is not adequate for precise manufactures, such as liquid crystals, and requires a separate grinding process.

The latter does not ensure sufficient reliability of the cutting plane and also requires the grinding process due to the cutting with the mechanical stress.

Technical Solution

Thus, as is proposed to solve the above problems, Korean Patent Application No. 10-2000-0042313 discloses a method for cutting a glass plate with a laser beam. As shown in FIGS. 1 and 2, the method comprises the steps of forming an initial crack in a desired cutting direction at a position where the cutting for a non-metallic material is started, heating the non-metallic material by irradiation of a primary heating beam along a line desired to be cut, performing a primary quenching on a portion heated by the primary heating beam to propagate the crack, heating the non-metallic material by irradiation of a secondary heating beam to a portion where the crack propagates, and performing a secondary quenching on a portion heated by the secondary heating beam.

In the above invention, the laser beam is used for the breaking process as well as the crack forming process and the scribing process.

As a means for forming the crack, a notching cracker made of the ultra hard materials, such as diamond, file, quartz glass, can be used.

The invention is provided with an oscillator 2 and a lens 3.

A laser beam emitted from the oscillator 2 is focused by the lens 3 and is irradiated on a material to be cut, thereby forming a notch 21 thereon.

Specifically, the laser beam 5 is oscillated by another oscillator (not shown) and is reflected by a reflection mirror 6, thereby being irradiated on the glass plate through a focusing lens 7.

As a means for performing primary quenching, the invention is provided with a quencher for forming the crack by quenching the portion heated by the carbonic acid laser and is provided with a first intake apparatus near the quencher at the back thereof.

A quenching fluid is injected into a quenching fluid inlet 10 and discharged from a quenching fluid cutlet 9, thereby performing the quenching process on the material.

The first intake apparatus comprises an intake hole 9 and an intake pipe 12.

As a breaking means of the invention, a second carbonic acid laser is used. In this case, a laser beam 13 is oscillated by the oscillator (not shown) and reflected by a reflection mirror 14, thereby being irradiated on the glass plate through a focusing lens 15.

FIG. 1 shows the case in which the breaking means consists only of the heating optical device, whereas FIG. 2 shows the case in which the breaking means consists of the heating optical device and the quencher.

Of course, as in the case of FIG. 1, addition of the quencher to the device can make the cutting plane smooth and is advantageous in enhancing a cutting efficiency. Further, the addition of the quencher also can reduce a dimensional error by preventing the cutting plane from being melted.

In the above invention, the method for cutting the glass plate using the laser beam mainly comprises the scribing process and the breaking process. In the scribing process, the glass plated is formed with a scribe line having a depth of 100~200 µm thereon by the scribing beam and a cooling nozzle. In the breaking process, while being centered on the scribe line, the glass plated is completely split by the breaking beam.

When using a general lens as shown in FIGS. 1 and 2, the laser beam irradiated on the glass has an energy level as shown in FIG. 3.

In FIG. 3, the scribe line to be cut is denoted by the dotted line in the middle thereof, in which while being centered on the scribe line, the energy level of the laser beam is maximal along the scribe line and gradually decreases toward outside of the scribed line.

When the laser beam has the energy level as mentioned above, the glass plate on the scribe line has a temperature higher than that around the scribe line, so that the cutting plane melts or has a temperature near the melting point thereof, causing a rough cutting plane and leaving traces caused by flow of the melt thereon.

For reasons described above, the cutting line is reduced in straightness and the cutting substrate has a cross-section with a reduced flatness, so that appearance and quality of the products are damaged.

Additionally, if additional scribing and breaking processes are performed again in the direction perpendicular to the preceding processes after finishing the scribing and breaking processes, the reduced straightness during the preceding processes causes the glass plated to be cut with deviation from a predetermined path to cut.

In order to solve the above problems, the inventor of the present invention specifically investigated optimal conditions for the scribing and breaking processes through several experiments and finally found specific conditions by which the glass plate can be stably cut without inconvenience as described above. The applicant of the present invention filed the invention with the Korean Intellectual Property Office (Korean Patent Application No. 10-2003-0000645).

Specifically, the problems as described above do not occur when the laser beam is irradiated with an irradiation area of 20~200 mm$^2$ and a plane radiation density of 0.05~2 J/mm$^2$, and is then irradiated with an irradiation area of 20~200 mm$^2$ and a volume radiation density of 0.1~0.5 J/mm$^2$, using a predetermined scribing means.

However, if the general focusing lens is used, the application cannot also overcome the problem caused by the energy distribution of the laser beam as shown in FIG. 3.

Advantageous Effects

The present invention has been made to solve the above problems, and it is an object of the present invention to provide an apparatus for cutting a glass plate with a laser beam, which comprises a means for lowering an energy level of the laser beam, having passed through a lens, on a scribe line in order to maximally enhance a quality of a cutting plane when cutting the glass plate with the laser beam.

DESCRIPTION OF DRAWINGS

The above and other objects, features and other advantages of the present invention will be more clearly understood from the following detailed description taken in conjunction with the accompanying drawings, in which:

FIG. 1 is a conceptual diagram of a conventional apparatus 1;

FIG. 2 is a conceptual diagram of a conventional apparatus 2;

FIG. 3 is an energy distribution diagram achieved by a conventional lens;

FIG. 4 is an energy distribution diagram that the present invention purposes to achieve;

FIG. 5 is a perspective view of a multi-focus lens on a disk according to Embodiment 1 of the present invention, showing an aspect of focusing and an energy distribution;

FIG. 6 is a perspective view of a multi-focus lens on a disk according to Embodiment 2 of the present invention, showing an aspect of focusing and an energy distribution;

FIG. 7 is a perspective view of a photo mask of Embodiment 3 of the present invention;

FIG. 8 is a conceptual diagram of an apparatus provided with the photo mask of FIG. 7; and FIG. 9 is a plan view of a photo mask of Embodiment 4 of the present invention.

BEST MODE

In accordance with an aspect of the present invention, the above and other objects can be accomplished by the provision of an apparatus for cutting a glass plate, comprising a cracking means for forming a minute crack at a point on the glass plate where the cutting is started, at least one scribing means using a laser beam absorbed by the glass plate, at least one quenching means using a quenching fluid after irradiation of the laser beam, a breaking means using the laser beam, the breaking means comprising a laser oscillator, a reflection mirror and a focusing lens, wherein the focusing lens has at least two or more focal lengths.

Preferably, the focusing lens has a focal length at a center of the lens longer than at an outer portion of the lens.

Preferably, the focusing lens has at least two or more focal lengths and has a cylindrical shape such that the focusing lens is located for the laser beam to be symmetrically irradiated in the lengthwise direction of the scribe line created by the scribing means.

Preferably, the focusing lens comprises a cylindrical Plano-convex type lens with a flat shaped bottom, an Aspheric type lens with a crown-shaped convex bottom, or a cylindrical Bi-convex type lens.

In accordance with another aspect of the present invention, there is provided an apparatus for cutting a glass plate, comprising a cracking means for forming a minute crack at a point on the glass plate where the cutting is started, at least one scribing means using a laser beam absorbed by the glass plate, at least one quenching means using a quenching fluid after irradiation of the laser beam, a breaking means using the laser beam, the breaking means comprising a laser oscillator, a reflection mirror and a focusing lens, the apparatus further comprising: a photo mask formed with light transmission openings for transmitting a part of the laser beam to be irradiated on the glass plate instead of the focusing lens.

Preferably, the light transmission openings are symmetrically arranged for the scribe line.

Preferably, the light transmission openings are symmetrically arranged for the scribe line and at the same time formed for the laser beam to be split perpendicular to the scribe line.

Mode for Invention

Now, preferred embodiments of the present invention will be described in detail with reference to the annexed drawings. In the drawings, the same or similar elements are denoted by the same reference numerals even though they are depicted in different drawings.

Embodiment 1 of the present invention will now be described with reference to FIG. 5.

When using a general focusing lens, an energy level of a laser bema irradiated on a glass plate has the normal distribution curve shown in FIG. 3.

That is, in accordance with the normal distribution curve of FIG. 3, while being centered on a scribe line, the energy level is maximal along the scribe line and gradually decreases to the outward of the scribe line.

As a result, the glass plate on the scribe line becomes higher in temperature compared with a temperature around the scribe line, so that the cutting plane melts or is heated to a temperature near the melting point thereof, thereby causing a rough cutting plane as well as a reduced straightness of the cutting line.

In order to solve these problems, the energy level on the scribe line should be lowered, as shown in FIG. 4. To accomplish this, the present invention employs a multi-focus lens having at least two or more focal lengths instead of the general lens having one focal length.

The multi-focus lens has one longer focal length for the light, having passed through the center of the lens, of a higher energy level among incident lights and has another focal length for the light, having passed through an cuter portion of the lens except the center thereof, similar to the focal length of the conventional lens.

In general, since the glass plate to be cut is located at a position within the focal lengths, when the multi-focus lens is used as the focusing lens, the glass plate is positioned between the focusing lens and a short focal point.

Thus, the light, having passed through the lens except the center of the focusing lens, has a similar energy level to that of the conventional lens, whereas since the glass plate is positioned at a position far from the focal point compared with the case of the conventional lens, the light, having passed through the center of the focusing lens, has a considerably lower energy level with a reduced focusing grade.

A multi-focus lens 60 on a disk according to Embodiment 1 of the present invention substitutes the conventional focusing lens 15 as shown in FIGS. 1 and 2.

Embodiment 1 of the present invention employs the multi-focus lens 60 of two focuses on the disk.

The focusing lens has a focal length at the center thereof longer than the focal length at the cuter portion thereof, and the focal length at the cuter portion thereof is similar to that of the conventional lens.

Thus, the light, having passed through the center of the focusing lens, is focused at a long focal point 62, while the light, having passed through the cuter portion thereof, is focused at a short focal point 61.

Since the glass plate to be cut is located between the multi-focus lens 60 and the short focal point 61, the energy level of the light is lowered at the center of the lens, as shown in FIG. 5, while being centered on the scribe line 19.

Thus, in accordance with the present invention, the glass plate on the scribe line may have a temperature lower than that of both sides of the scribe line.

That is, as the multi-focus lens has a disk shape, as shown in FIG. 5, the focused light, having passed thrash the lens, also has a circular cross-section, and the energy level of the light shows a volcanic-cone shape.

Meanwhile, although Embodiment 1 of the present invention can create an energy density difference between the center and the cuter portion of the lens on a cross-section in which the glass plate is fixed without moving, the movement of the glass plate can cause a continuous overlap of the energy irradiated cross-sectional areas due to the volcanic-cone shaped energy level, resulting in a problem that the laser beam of a higher energy level is irradiated on the scribe line.

Thus, in order to create the energy level as shown in FIG. 3 on each position of the scribe line the laser beam with the energy level as shown in FIG. 3 should be created in the lengthwise direction of the scribe line.

For this purpose, Embodiment 2 of the present invention provides another multi-focus lens having a cylindrical shape as shown in FIG. 6, which will be used for the focusing lens.

In view of a cross-section, the cylindrical-shaped multi-focus lens 70 has one long focal length for the light, having passed through the center of the lens, of a higher level among the incident lights and has another focal length for the light, having passed through the cuter portion of the lens except the center thereof, similar to the focal length of the conventional lens.

Thus, the light, having passed through the center of the focusing lens is focused at a long focal point 72, and the light, having passed through the cuter portion of the lens, is focused at a short focal point 71. The energy level created on the short and long focal points 71 and 72 in the cylindrical multi-focus lens 70 exhibits the shape as shown in FIG. 6.

In general, since the glass plate to be cut is located at a position within the focal lengths, when the multi-focus lens as described above is used as the focusing lens, the glass plate is positioned between the short focal point 71 and the cylindrical multi-focus lens 70.

That is, the light, having passed through the lens except the center of the focusing lens, has a similar energy level to that of the conventional lens, whereas since the glass plate is positioned far from the focal point compared with the case of the conventional lens, the light, having passed through the center of the focusing lens, has a considerably lower energy level with a reduced focusing grade.

As the multi-focus lens of Embodiment 2 has the cylindrical shape, the energy distribution also shows the cylindrical shape.

That is, regardless of the continuous irradiation of the laser beam and movement of the glass plate in the direction perpendicular to the cutting line, there can be achieved the laser beam of a constant energy distribution curve.

The multi-focus lens as described above may comprise the cylindrical Plano-convex type lens with a flat shaped bottom, an Aspheric type lens with a crown-shaped convex bottom, a cylindrical Bi-convex type lens, or combination of various shapes with a cylindrical function.

Embodiment 2 of the present invention is superior to Embodiment 2 in that the cutting margin is enhanced with a remarkable enhancement in a range of laser power for the breaking, which does not cause the melting phenomenon deteriorating the plane which is cut using the cylindrical multi-focus lens of Embodiment 2.

Embodiment 2 of the present invention will now be described in detail with reference to FIG. 6.

When using the general focusing lens, the energy level of the laser beam irradiated on the glass plate has the normal distribution curve as shown in FIG. 3, so that while being centered on scribe line, the energy level of the laser beam is maximal along the scribe line and gradually decreases outward of the scribe line.

Thus, the glass plate on the scribe line becomes higher in temperature than the glass plate around the scribe line, so that the cutting plane melts or is heated to a temperature near the melting point thereof, thereby causing the rough cutting plane as well as the reduced straightness of the cutting line. In order to solve these problems, as shown in FIG. 4, Embodiment 3 of the present invention employs a photo mask instead of the focusing lens.

The photo mask can also be used along with the focusing lens.

The photo mask is provided with light transmission openings for transmitting a part of light in order to form a predetermined irradiation shape of the laser beam on a metallic body.

Since the photo mask creates the predetermined irradiation shape by shielding the part of the light of the laser beam, the photo mask has a raised temperature due to the part where the light is shielded by the photo mask.

Thus, the photo mask is preferably provided with a separate quenching means.

In order to maximize quenching efficiency, the photo mask is preferably further provided with a water quenching means (not shown) inside the photo mask.

Further, since the photo mask is basically made of a material with a good thermal property, the material preferably comprises a heat resistant material.

The light transmission openings formed at the photo mask are shaped to solve the problems caused by the energy level.

For the energy level on the scribe line not to have a maximum value, the light transmission openings of the photo mask are arranged to have a symmetrical shape centered on the scribe line.

That is, the energy level has the shape as shown in FIG. 4.

Further, the light transmission openings may be formed to split the laser beam in the direction perpendicular to the scribe line.

As mentioned above, the laser beam is split in the direction perpendicular to the scribe line through the light transmission openings, and the energy level as shown in FIG. 4 is generated parallel to the scribe line.

Thus, when cutting the glass plate in the direction perpendicular to the original scriber line using the laser beam split by the light transmission openings, the crossing point is already in the state of being cut in the direction perpendicular to the present scribe line by the preceding process. Thus, problems in the cutting plane or deterioration in the straightness of the scribe line caused by greater application of energy can be overcome by lowering the energy level around the crossing point in the direction perpendicular to the present scribe line.

FIG. 7 shows the photo mask 50 according to Embodiment 3 of the present invention, at which the light transmission openings 50 are formed to split the laser beam in the direction perpendicular to the scribe line 19 as well as parallel thereto.

As shown in FIG. 8, the photo mask 50 constitutes the apparatus of the present invention instead of the conventional focusing lens 15.

Thus, if the apparatus of the invention is practically applied, as shown in FIG. 4, the glass plate on the scribe line may have a temperature lower than that around the scribe line, that is, on both sides of the glass plate on the scribe line, and the energy level as shown in FIG. 4 is also formed in the direction parallel to the scribe line.

FIG. 9 shows the shape of a photo mask 50' according to Embodiment 4 of the present invention.

Since the photo mask 50' is formed with light transmission openings 51' symmetrically arranged for the scribe line, the energy level as shown in FIG. 4 is formed only in the direction perpendicular to the scribe line.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

INDUSTRIAL APPLICABILITY

As is apparent from the above description, in accordance with the present invention, when the glass plate is cut with the multi-focus lens or the photo mask, the glass plate on the scribe line has a temperature lower than that around the scribe line, so that the problem of flowing due to the melting is prevented, thereby provide a clean cutting plane.

The invention claimed is:

1. An apparatus for cutting a glass plate, comprising:
a cracking means for forming a minute crack at a point on the glass plate where the cutting is started,
at least one scribing means using a laser beam absorbed by the glass plate,
at least one quenching means using a quenching fluid after irradiation of the laser beam,
a breaking means using the laser beam, the breaking means comprising a laser oscillator,
a reflection mirror and a focusing lens, and
a photo mask formed with light transmission openings for transmitting a part of the laser beam to be irradiated on the glass plate,
wherein the light transmission openings are formed to prevent the laser beam being irradiated on a scribing line by the scribing means, and to symmetrically arrange the laser beam for the scribe line.

2. The apparatus as set forth in claim 1, wherein the light transmission openings are formed for the laser beam to be split perpendicular to the scribe line.

* * * * *